United States Patent [19]
Evans et al.

[11] 3,908,470
[45] Sept. 30, 1975

[54] LOW COST, LOW PRESSURE GAS BEARING GYRO

[75] Inventors: John Evans, Oakland, N.J.; Murray Hefter, Rockaway, N.Y.

[73] Assignee: The Singer Company, Little Falls, N.J.

[22] Filed: Nov. 5, 1973

[21] Appl. No.: 412,711

[52] U.S. Cl. .................................. 74/5.6 D; 74/5.7
[51] Int. Cl. ............................................. G01c 19/28
[58] Field of Search ........ 74/5.1, 5.12, 5.6 D, 5.6 E, 74/5.7; 308/9, DIG. 1

[56] References Cited
UNITED STATES PATENTS

| | | | |
|---|---|---|---|
| 3,058,359 | 10/1962 | Wing | 74/5.6 D |
| 3,254,538 | 6/1966 | Thomson et al. | 74/5.7 |
| 3,257,854 | 6/1966 | Schneider et al. | 74/5.7 |
| 3,393,569 | 7/1968 | Lief | 74/5.7 |
| 3,526,143 | 9/1970 | Henley | 74/5.7 X |

*Primary Examiner*—Manuel A. Antonakas
*Attorney, Agent, or Firm*—T. W. Kennedy

[57] ABSTRACT

A gyroscope having a rotor supported by pressurized gas within an enclosed chamber surrounding stator structure enclosing the supported portion of the rotor. The gas is pressurized by substantially reducing the volume of the chamber by firing a pyrotechnic squib to move a flexible diaphragm forming a wall of the chamber. Mechanism is provided for engaging and effecting spin-up of the rotor and automatically disengaging therefrom, as well as electronic pick-off and signal processing means. The instrument is conveniently constructed by separately assembling, testing, aligning, etc., three major subassemblies which are then joined together to form the finished gyroscope.

16 Claims, 8 Drawing Figures

LOW COST, LOW PRESSURE GAS BEARING GYRO

BACKGROUND OF THE INVENTION

The present invention relates to gyroscopes and, more particularly, to spherical, gas bearing gyros having short operating lives.

Gyroscopes are used as guidance instruments in a wide variety of applications. Since a number of basic types of gyro designs are available, the requirements imposed by the intended application normally dictate the choice of a particular design type. For example, gyros used in short-range missle guidance systems must withstand high acceleration levels and remain highly accurate and reliable in operation. The basic design type most suited to such applications is that wherein a spherical rotor element is supported by a pressurized gas during rotation.

In conventional gyros of this type, the gas is stored in a pressurized container and released at the time required. A suitable regulator is commonly employed to insure that the gas is continuously supplied at the desired pressure. Rotation or "spin-up" is imparted by appropriate means to initiate the gyroscopic effect after the rotor is levitated by the pressurized gas.

Using mass fabrication techniques and other presently known design and manufacturing principles to minimize the cost of the finished gyro, commensurate with design requirements, approximately 40 percent of the cost of the instrument is represented by the gas supply and spin-up system. Besides representing a large portion of the total instrument cost, use of pressurized gas containers introduces reliability problems since they are subject to possible leakage. This requires periodic testing of the pressurized supply, which is also difficult and adds to the costs involved.

A principal object of the present invention is to provide a gas bearing gyro in which significant economies are achieved principally through redesign of the gas supply system.

A further object is to provide a gyroscope wherein ambient air is compressed, when operation of the instrument is initiated, to support the rotor.

Another object is to provide a gas bearing gyro having no stored, pressurized gas, thereby allowing indefinite storage without leakage problems.

A still further object is to provide a gas bearing gyro comprising interchangeable sub-assemblies which can be simply tested and/or aligned prior to final assembly, obviating the need for post-assembly alignment.

Still another object is to provide a spherical, gas bearing gyroscope made up of simple and inexpensive components in a plurality of sub-assemblies which may be quickly and easily assembled and disassembled.

Other objects will in part be obvious and will in part appear hereinafter.

SUMMARY OF THE INVENTION

The instrument of the present invention includes a rotor in the form of a hemispherical shell having an opening at the top and an inertia rim at the circular edge. The stator casing is provided with a hemispherical cavity within which the major part of the rotor is supported. A sealed pressure chamber surrounds the stator, and openings are provided for communication of the chamber with the cavity on both sides of the rotor.

Ambient air within the chamber is compressed by movement of a piston to reduce the volume of the chamber. The rigid piston is sealed to the chamber walls by a rolling diaphragm and is driven by means of a pyrotechnic squib connected to the piston by a steel wire passing through the aforementioned opening in the rotor. When the squib is fired, the stroke of the piston raises the pressure sufficiently to support the rotor within the cavity for the time and acceleration required.

With the rotor supported by the lubricating gas, rotation is imparted to achieve the gyroscopic effect. Power for the rotor spin-up is provided by means of a spring motor and transmitted to the rotor through intermediate structure. It is possible, and may be preferable, to spin up the rotor by gas generated from a second pyrotechnic squib acting in the nature of a turbine. Besides the spring motor, a simple caging system forms a part of this subassembly.

A third subassembly comprises a suitable electronics package for generating signals commensurate with rotational displacement of the stator about axes perpendicular to one another and to the spin axis of the rotor. These signals are utilized in known manner to provide guidance for the moving body with which the gyro is associated.

All three subassemblies are designed to be built and tested separately on suitable fixtures. Assembly can be accomplished in a manner which establishes the caging gap adequately and transfers the caging plane to the external reference mounting surfaces.

DETAILED DESCRIPTION

The gyroscope of the present invention is intended for use in such applications as guidance systems for anti-tank missiles, and the like, wherein the active operating life of the instrument may be on the order of three seconds. When the missile is launched, an acceleration level of 225g may be reached, dropping to perhaps 80g immediately thereafter. The gyro must continue to operate to the required levels of accuracy, e.g., a static drift of 500°h, or better. Spherical ball bearing or gimbaled type gyros cannot conveniently be made to fulfill such requirements, the spherical, pressurized gas bearing representing the most acceptable design type.

Figure 1:
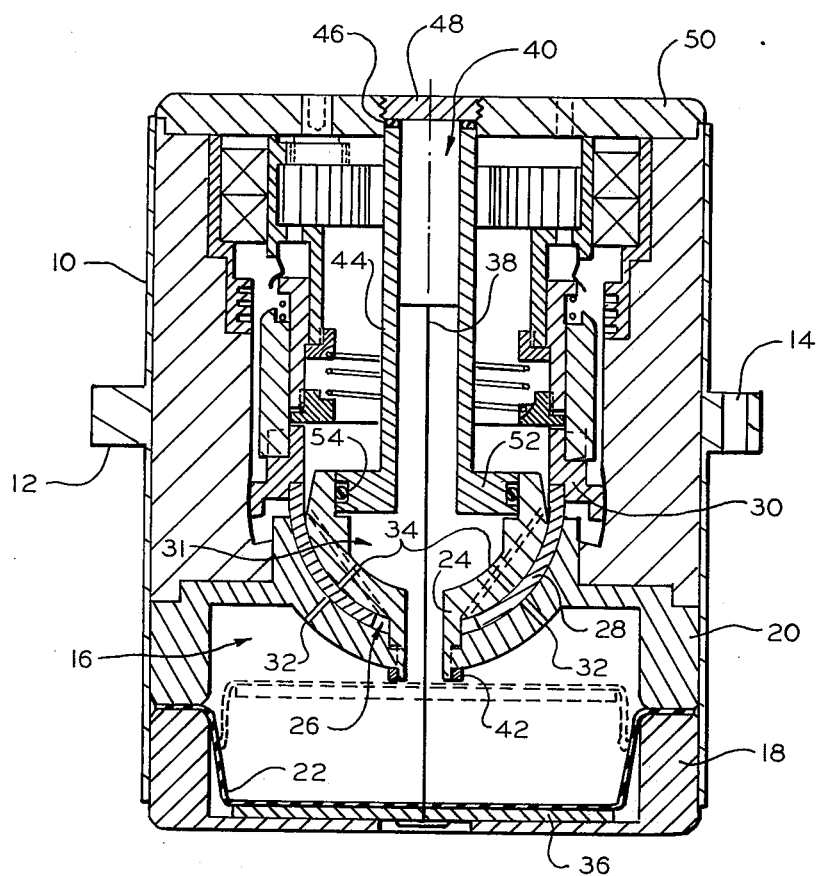
FIG. 1 is an elevational view, in vertical section through the center, of a fully assembled instrument representing a preferred embodiment of the present invention.

Referring now to the drawings, in FIG. 1 is shown a fully assembled instrument having a cylindrical external configuration. Outer shell or sleeve 10 encloses the instrument. Flange 12 is brazed to sleeve 10 and is provided with a number of holes 14 for screws or bolts to affix the instrument to the supporting structure on the missile. The interface mating surface of flange 12 is used as the mechanical reference surface.

At one end of the instrument enclosed chamber 16 is formed by end closure element 18 and stator element 20. Elements 18 and 20 are secured tightly together with the marginal edge portion of impermeable, flexible diaphragm 22 therebetween. Diaphragm 22 is of the "rolling" type, such as that commercially available under the trade name Bellofram, from Bellofram Corp., of Blanchard Rd., Burlington, Mass., and extends completely across chamber 16, dividing the latter into two portions.

The inner portion of stator element 20 is of hemispherical configuration, and a second, hemispherical stator element 24 is affixed thereto. The concave surface of stator element 20 opposes, in substantially parallel, spaced relation, the convex surface of stator element 24, thus forming a cavity, designated generally by reference numeral 26, therebetween. Rotor element 28, in the form of a hemispheric shell, is positioned largely within cavity 26, the outer edge of the rotor, including inertia rim 30, being outside the cavity. Each of stator elements 20 and 24, and rotor 28 are provided with an axial opening, through which chamber 16 communicates with chamber 31 on the concave side of stator element 24. Stator elements 20 and 24 are each provided with a plurality of orifices 32 and 34, respectively, through which chambers 16 and 31 communicate with cavity 26 on opposite sides of rotor 28. As explained later in more detail, pressurized gas within chamber 16 is provided, through orifices 32 and 34, to cavity 26 to provide an air bearing between rotor 28 and each opposing surface of stator elements 20 and 24.

Affixed to diaphragm 22 is rigid plate 36. Steel wire 38 extends from a fixed connection to plate 36, through chambers 16 and 31 to a connection with pyrotechnic squib 40, as described more fully hereinafter, for movement in an upward direction, in the orientation shown in FIG. 1, upon firing of the squib. Wire 38 is moved upward, pulling plate 36 and diaphragm 22 into contact with annular stop 42, encircling the opening through stator element 20. Thus, diaphragm 22 and plate 36 are moved from the position shown in solid to that shown in dotted lines in FIG. 1, thereby substantially reducing the volume of chamber 16 and compressing the air within chambers 16 and 31 from atmospheric to a considerably higher pressure. The pressurized air will enter cavity 26 through orifices 32 and 34, thereby levitating rotor 28.

Squib 40 is supported within one end of hollow tube 44 which is sealed by O-ring 46 to threaded plug 48 at the center of end plate 50. At the opposite end, tube 44 is provided with rim 52 which is sealed by O-ring 54 to stator element 24. Thus chambers 16 and 31 are effectively air-tight, being at atmospheric pressure when sealed and capable of maintaining the pressure generated by movement of diaphragm 22 except to the extent that gas flows through orifices 32 and 34, and cavity 26.

Figure 2:
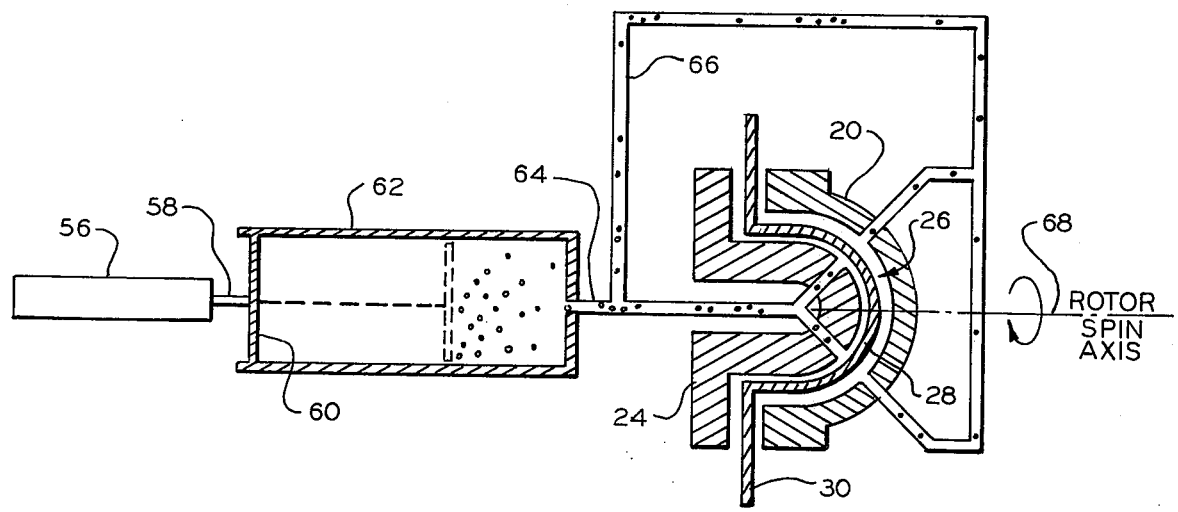
FIG. 2 is a functional diagram illustrating the operation of the gas supply system of the instrument of FIG. 1.

Referring to FIG. 2, the manner of operation of the above-described gas rotor support system is shown diagrammatically. The action of squib 40 pulling on wire 38 is the equivalent of driver 56 operating to move rod 58 toward the right, thereby forcing piston 60 from the position shown in solid lines to that shown in dotted lines. The gas within cylinder 62 is thus compressed and forced through distribution lines 64 and 66. The same reference numerals as in FIG. 1 are used for the diagrammatic representations of stator elements 20 and 24, rotor 28 and inertia rim 30. It is thus evident how rotor 28 is supported within cavity 26 for rotation about axis 68. The required rate of flow for supporting and lubricating the rotor is a function of the rotor mass and size, the rotor-stator gap, and the forces generated by the vehicle acceleration.

Figure 3:
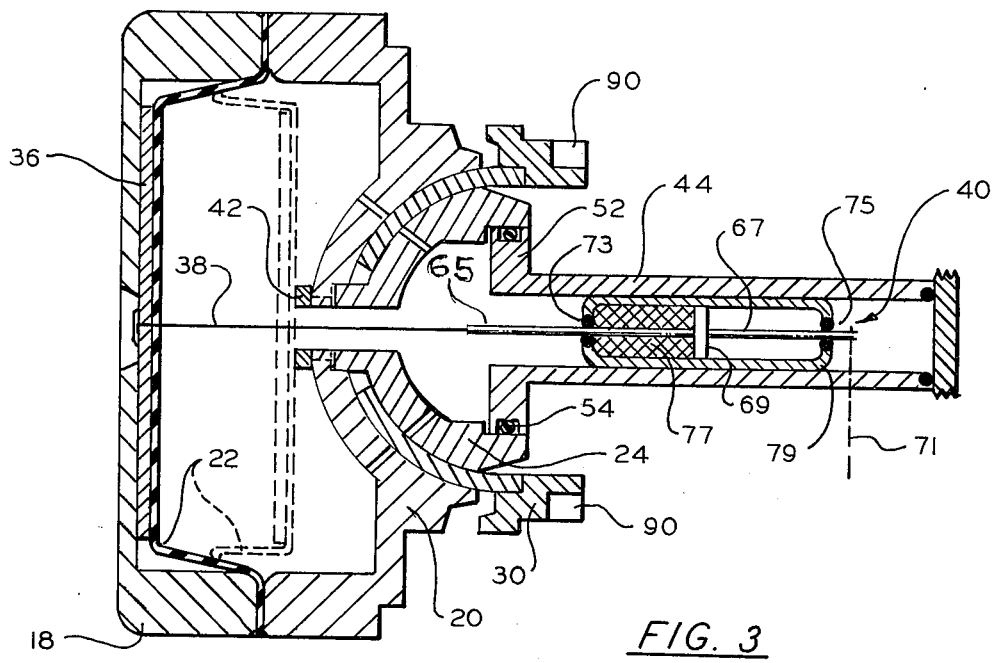
FIG. 3 is an elevational view, in section, of certain elements of the instrument representing a first major subassembly thereof.

The elements thus far described make up one of the three major subassemblies of the instrument and are shown separately in FIG. 3 for greater clarity. These elements, may conveniently be assembled and tested prior to combination with the other subassemblies. The sealed gas chamber is integrally included by the movable diaphragm and casing (rotor elements 20 and 24 and tube 44). This obviates the need for gas distribution lines, and minimizes overall package space, weight and cost. The rolling diaphragm has almost no friction and a life of several million flexures. In the illustrated design, the total air volume is reduced to about one-third of its original volume, thereby increasing the internal pressure from atmospheric (about 15 p.s.i) to about 45 p.s.i. In typical designs, the gas volume may be decreased from 30cc to 10cc. The squib need not be of the latching type. It will continue to apply 100 to 200 pounds of force to the wire for considerably more than 3 seconds before its internal temperature and pressure decay.

The pyrotechnic squib denoted in FIG. 1 by reference numeral 40 is also shown in greater detail in FIG. 3. Shafts 65 and 67 extend out of the opposite ends of squib 40 from internal piston 69. Wire 38 is fixedly attached to shaft 65 and a mechanical connection, indicated schematically by dotted line 71, is provided from shaft 67 for actuation of the rotor spin-up as described later. O-ring seals 73 and 75 prevent leakage of the gases generated by firing propellant 77 outside of squib casing 79 since such gases are invariably hot and contaminated with particulate matter. Squib 40 is fired electrically in conventional fashion by passing a small current, e.g., 1 ampere, through a wire within propellant 77 at such time as it is desired to actuate the gyro mechanism.

Figure 4:
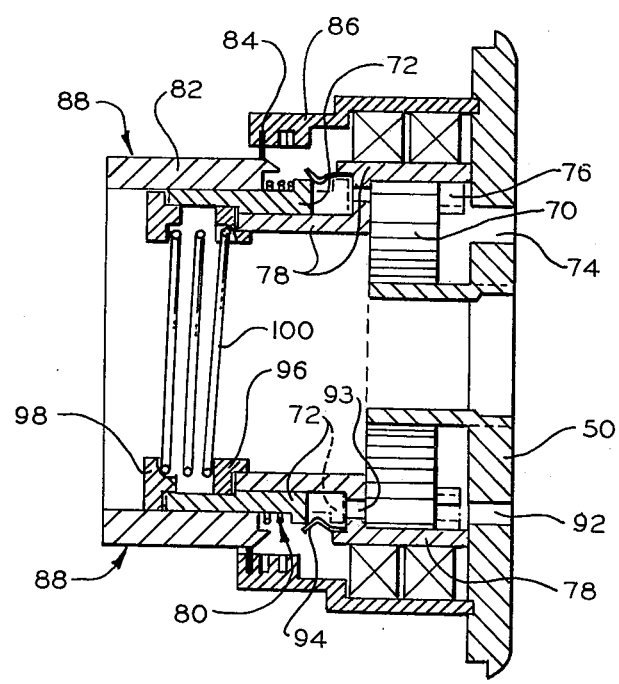
FIG. 4 is a similar view of a second major subassembly.

Turning now to FIG. 4, the second major subassembly is shown. The device is caged by winding up spring motor 70 and snapping caging slide 72 in position. A wind-up key (not shown) is inserted through opening 74 in end closure 50 and engaged with wind-up gear 76. The latter is mounted to motor drive shaft 78 which is rotated during wind-up in a direction opposite to when it is driving. Drive shaft 78 is mounted for rotation within bearings 81 upon release of the mound spring motor. A ratchet (not shown) on wind-up gear 76 prevents spring motor 70 from unwinding released in response to firing of squib 40 by mechanical connection 71 between shaft 67 and the ratchet.

The compressed coupling spring 80 urges rotor coupling 82 toward the left, as seen in FIG. 4. Rotor coupler pin 84 will engage the pitched thread of the stationary pullback nut 86 and rotor coupler 82 will be moved axially until it meshes in rotor rim 30. Cooperating portions such as tapered teeth or pins on rotor coupler 82 (indicated generally by reference numeral 88) and rim 30, (indicated in FIG. 3 by reference numeral 90) are provided for this purpose, whereby rotation will be imparted from the coupler to the rotor when the two are engaged.

An appropriate stop is provided on nut 86 to prevent movement of pin 84 past the position wherein the coupler and rotor are properly meshed. To complete the caging and wind-up operation, caging slide 72 is pushed axially toward the left, from the position shown in dotted lines to that shown in solid lines, by means of a rod inserted through opening 92 in end closure 50 and opening 93 in motor drive shaft 78. Caging spring latch 94 will snap into place and maintain slide 72 in the position shown in solid lines.

Both caging slide 72 and rotor coupler 82 are free to move axially on drive shaft 78, but are prevented from rotating relative thereto by splines (not shown), or the like. The elements are shown in FIG. 4 in the ready-to-operate condition with the spring motor wound. Caging spring latch 94 urges caging slide 72 against caging stop 96. Axially adjustable caging nut 98 in this position inhibits the rotor spin axis from deviating more than one milliradian from its initial position while the rotor is spun-up. Uncaging pull-back spring 100 links caging slide 72 to motor drive shaft 78 and is in a stretched position, under tension, when the rotor is caged.

Upon actuation, motor drive shaft 78 is driven by spring motor 70. This rotation is imparted to both caging slide 72 and rotor coupler 82, and thus rotor 28. Caging slide 72 is retained against axial movement by caging spring latch 94. As rotor coupler 82 rotates relative to stationary pull-back nut 86 it moves axially to the right, as shown in FIG. 4. The motor will accelerate the rotor to e.g. 100 revolutions per second in two revolutions, which is adequate for good gyro performance. Two revolutions of drive shaft 78 also results in rotor coupler 82 moving to the right sufficiently to uncouple from rim 30 of the rotor. Also, rotor coupler 82 contacts and lifts caging spring latch 94, freeing caging slide 72 and compressing coupling spring 80. The freed caging slide is then pulled back by uncaging pull-back spring 100, thereby uncaging rotor 28. When rotor coupler 82 has moved to the unlatched position, pin 84 is in a ringed slot at the end of the thread in nut 86 where it can continue spinning without moving axially.

Figure 5:
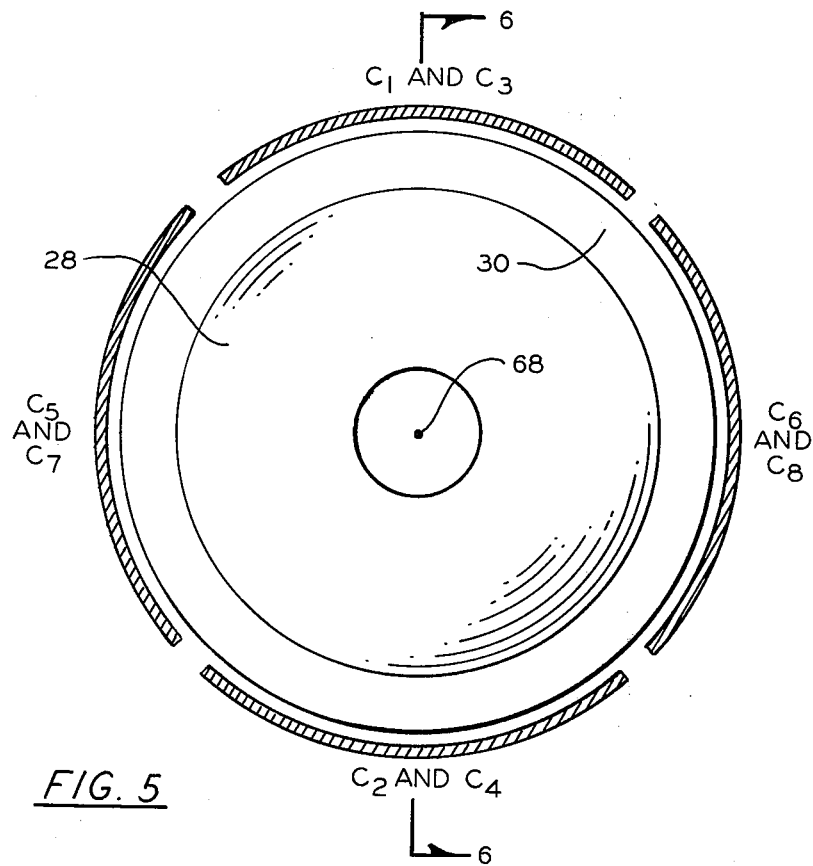
FIG. 5 is a somewhat diagrammatic, plan view of certain elements of a third subassembly, comprising the pickoff and electronics package.
Figure 6:
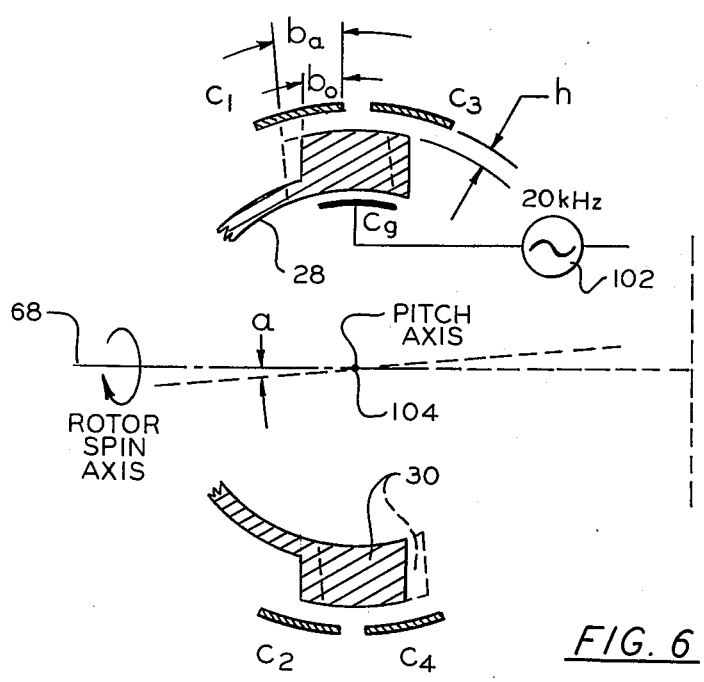
FIG. 6 is a partly schematic sectional view taken on the line 6—6 of FIG. 5.
Figure 7:
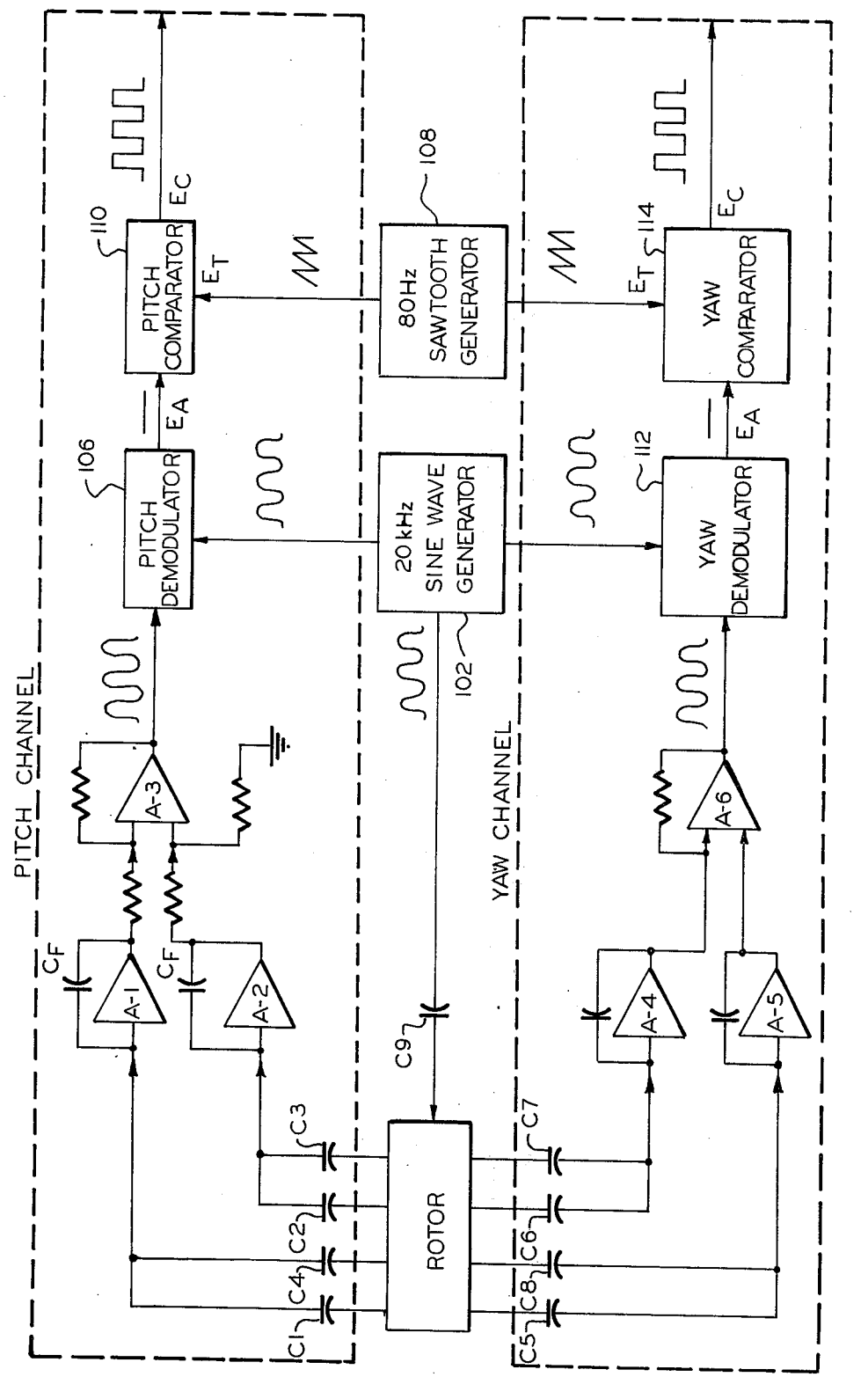
FIG. 7 is a schematic diagram of the electrical error signal generation.

FIGS. 5-7 illustrate the preferred embodiments of means for sensing relative rotational movement of the rotor and stator about pitch and yaw axes (i.e., other than about the rotor spin or roll axis). An electronic pickoff system utilizing non-contacting, variable capacity sensing elements is preferred. The capacitive pickoffs are simple, rugged and inexpensive, and may utilize existing compenents which do not require sophisticated fabrication techniques. The electronic components used in conjunction with such pickoffs is all solid-state, occupies a small volume, is light in weight, and economical in power consumption. Its function is non-critical, reliable, and resistant to the effects of extremes in environment over long periods.

A total of nine capacitor plates, indicated by reference characters C1 through C9, are positioned adjacent rim 30 of rotor 28. Each plate is affixed to stationary supports within the instrument casing with eight capacitors (C1–C8) being arranged in four pairs concentrically with the outside of rim 30, and capacitor C9 similarly arranged adjacent the inside of the rotor rim. FIGS. 5 and 6 clearly illustrate the positioning of each arcuate plate with respect to the rotor, it being understood, of course, that the rotor rim itself forms one plate of each capacitor.

Capacitor C9 is used to couple a signal from 20 KHz sine wave oscillator 102 to the rotor. Capacitors C1–C4 are used for sensing relative rotation about the pitch axis, indicated by dot 104 in FIG. 6. Capacitors C5–C8 sense relative rotation about the yaw axis in the same manner.

When rotor spin axis 68 is aligned with the stator axis, rim 30 will be centered with respect to all fixed plates adjacent thereto and the effective value of all of capacitors C1-C8 is zero, and the effective difference between opposed pairs of capacitors is zero. For example, at null $(C1 + C4) - (C2 + C3)$ is zero. Any angular deviation of the stator axis alignment from the spatially fixed rotor axis causes an unbalance in the value of the capacitors in the plane of the angular deviation, the value on one side getting larger and that on the other side getting smaller. The system senses the amplitude of the physical angular deviation by comparing the amplitude of the a.c. electrical signal coupled through the individual capacitors around the rotor rim.

A fragment of the rotor is shown in FIG. 6, together with the fixed plates of capacitors C1–C4. Rotor rim 30 is shown in solid lines in the position it occupies when rotor spin axis 68 is aligned with the stator axis. In this position, the effective overlap area of each of the fixed plates is equal with respect to rim 30 and each plate is spaced therefrom by distance h, whereby the value of all capacitors is equal. When the stator rotates about pitch axis 104 through angle $a$, the relative position of the rotor rim and capacitor plates is as indicated in dotted lines. The difference effective overlap area with respect to capacitor C1 is indicated by $b_0$ and $b_a$ for axis displacements of 0° and a°, respectively. The value of capacitors C1 and C4 will increase, and the value of capacitors C2 and C3 will decrease due to the change in effective overlap area, the difference in value being function of angular displacement. By summing capacitors C1 and C4, and capacitors C2 and C3, changes in capacity due to run-out and axial motion tend to cancel out. The sum of the pair capacities remains the same since the values of opposing capacitors of each pair change in opposite directions.

FIG. 7 is a simplified, functional, block diagram of the overall pickoff assembly. Capacitors C1 and C4 are added in parallel, as are capacitors C2 and C3, by operational amplifiers A1 and A2, respectively, each having capacitors $C_F$ connected between the input and output sides thereof. The outputs of amplifiers A1 and A2 are fed to differential amplifier A3, having as an output a voltage proportional to $$\frac{C1 + C4}{C_F} - \frac{C2 + C3}{C_F}$$

which is equal to a constant times the angular displacement from null of the rotor spin axis and corresponding stator axis about the pitch axis. This form of summing and differencing attenuates errors produced by displacements of the rotor and noise effects produced by run-out of the rotor.

The analog angle output signal for the pitch axis from amplifier A3 is provided to pitch demodulator 106 where the 20 KHz analog signals are demodulated into dc outputs proportional to the pitch angle deviation. The conversion of this signal, designated $E_A$ in FIG. 7, to the PDM ($E_c$) is accomplished by comparing it with an 80 Hz triangular periodic reference ($E_T$) from signal generator 108. At the output of comparator 110 the 80 Hz signal (Ec) is "1" when $E_A$ is greater than $E_T$, and "0" when $E_A$ is less than $E_T$. The pulse width is thereby proportional to the amplitude of the analog signal, a function of the physical deviation of the axes, and cycling at an 80 Hz rate.

The PDM output is derived electrically from an analog output rather than directly from the rotor because it is simpler and less expensive to generate a stable, precise 80 Hz signal electrically than to keep the rotor spinning at a rate with high enough precision and stability to permit generation of the PDM directly.

Demodulator 112 and comparator 114 receive signals from generators 102 and 108, respectively, to provide the yaw PDM in a manner identical to that just described for the pitch axis. Implementation of the system by selection of proper components, design of the power supply circuit, etc., is well within the purview of those skilled in the art, whereby it is unnecessary to discuss the construction and operation of angle pickoff and electronics processing beyond the simplified diagram of FIG. 7.

Figure 8:
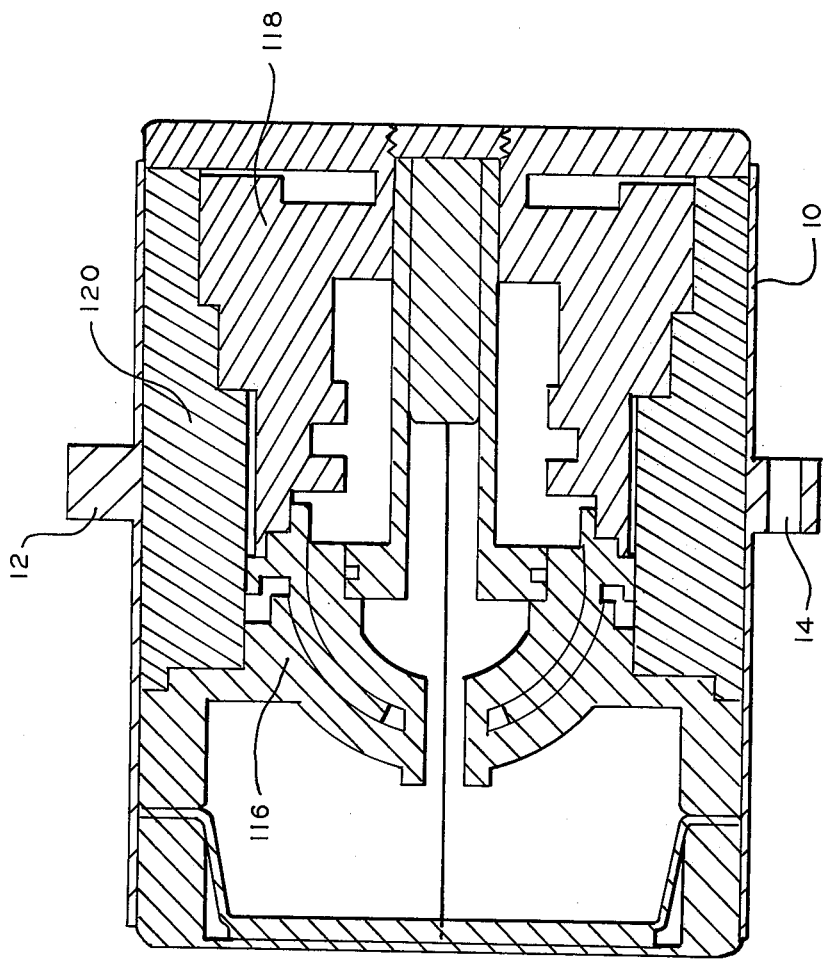
FIG. 8 is an elevational view of the instrument, as in FIG. 1, showing the major subassemblies in outline only to illustrate the mechanical interfacing thereof.

FIG. 8 illustrates the positional relationship of each major subassembly within the finished instrument. The gas pressurization and rotor subassembly is indicated by the single cross-hatch portion, designated by reference numeral 116. The caging and spin-up subassembly is shown in thick cross-hatch and designated by reference numeral 118. The components of the angle pick-off and electronics subassembly are provided in the space covered by double cross-hatch lines, and designated 120. It is important to note that each of the individual subassemblies may be separately assembled, aligned, tested, etc., prior to being brought together for final assembly and enclosure in sleeve 10. The electronic components and circuits may be provided in thick film, chip-component, microcircuit form on ceramic substrates. After assembly and test, each portion of the electronics package is encapsulated in a light weight, thermally conductive material.

What is claimed is:

1. A gyroscope unit comprising:
   a. a stator element defining a cavity;
   b. a rotor element mounted within said cavity for rotation about a first axis with respect to said stator when supported by a pressurized gas;
   c. means defining an enclosed gas filled chamber having a wall portion movable from a first to a second position to substantially reduce the volume of said chamber thereby compressing the gas therein and increasing the internal pressure from a first value equal to atmospheric pressure to a second value;
   d. means permitting communication between said gas filled chamber and said cavity whereby when said internal pressure is increased to a second value said increased pressure at a second value will be present in said cavity to support said rotor element;
   e. a pyrotechnic squib arranged to move said wall portion from said first to said second position when actuated;
   f. means for imparting rotation to said rotor about said first axis;
   g. means for sensing relative movement between said rotor and stator about second and third axis mutually perpendicular to said first axis.

2. The invention according to claim 1 wherein said movable wall portion comprises a flexible diaphragm.

3. The invention according to claim 2 wherein said diaphragm is of the rolling side-wall type.

4. The invention according to claim 3 and further including a wire connected to move said diaphragm in response to firing of said squib.

5. The invention according to claim 1 wherein said rotor is hemispherical and at least that portion of said stator assembly defining said cavity is of like configuration.

6. The invention according to claim 5 wherein a central opening is provided at the axis of said rotor and stator assembly, said chamber communicating through said opening with opposite sides of the hemispherical portion of said stator assembly.

7. The invention according to claim 1 wherein said means for imparting rotation comprise a spring motor and structure coupling said spring motor and said rotor.

8. The invention according to claim 7 wherein said rotor includes an annular rim and said coupling structure includes a member movable into and out of a position wherein rotation of said member is imparted to said rim.

9. The invention according to claim 8 wherein a predetermined amount of rotation of said member effects movement thereof out of said position.

10. The invention according to claim 8 wherein said member is movable into and out of said position in a direction parallel to said first axis.

11. The invention according to claim 1 wherein said sensing means comprise capacitors each having plates respectively associated with each of said rotor and stator means positioned to reflect a change in capacitance value in response to relative rotation of said rotor and stator means about either of said second and third axes.

12. The invention according to claim 11 wherein a plurality of individual capacitor plates are associated with said stator means and a portion of said rotor forms the other plate of each of said capacitors.

13. The invention according to claim 12 wherein said rotor is hemispherical in shape and said portion comprises an annular rim.

14. The invention according to claim 1 wherein said means permitting communication between said gas filled chamber and said cavity comprise a plurality of passageways.

15. The invention according to claim 1 wherein said stator, said rotor, said means defining an enclosed chamber, and said means permitting communication comprise a first sub-assembly, said means to impart rotation comprise a second sub-assembly and said means for sensing relative rotational movement comprising a third sub-assembly and further including a means holding said first, second and third sub-assemblies together in predetermined relationship.

16. A gyroscope unit comprising a stator element defining a hemispherical cavity;
  b. a rotor element of hemispherical shape having its measure portion disposed within said cavity for rotation about the first axis with respect to said stator when supported by a pressurized gas;
  c. means defining an enclosed gas filled chamber having a wall portion movable from a first to a second position to substantially reduce the volume of said chamber, thereby compressing the gas therein and increasing the internal pressure from a first pressure substantially equal to atmospheric pressure to a second value, said chamber communicating through a central opening at the axis of said stator and rotor elements with opposite sides of the hemispherical portion of said stator element;
  d. a plurality of passageways on each side of said hemispherical portion of said stator element communicating with said cavities;
  e. means actionable to move said wall portion from said first to second position;
  f. means for imparting rotation to said rotor about said axis; and
  g. means for sensing relative rotational movement between said rotor and stator means about second and third axis mutually perpendicular with said first axis.

* * * * *